US012574384B2

(12) United States Patent

Teixeira et al.

(10) Patent No.: US 12,574,384 B2

(45) Date of Patent: Mar. 10, 2026

(54) ROLE-BASED ACCESS CONTROL FOR USERS IN A COMPUTER SYSTEM OF A RENEWABLE POWER PLANT

(71) Applicant: VESTAS WIND SYSTEMS A/S, Aarhus N (DK)

(72) Inventors: Luis Miguel Teixeira, Vizela (PT); Diogo Andre Ribeiro Goncalves, Vila Nova de Gaia (PT); Rafael Angelo Souza Carneiro, Oporto (PT)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 102 days.

(21) Appl. No.: 18/501,964

(22) Filed: Nov. 3, 2023

(65) Prior Publication Data

US 2024/0154974 A1     May 9, 2024

(30) Foreign Application Priority Data

Nov. 4, 2022    (EP) .................................... 22205608

(51) Int. Cl.
   *H04L 9/40*         (2022.01)
(52) U.S. Cl.
   CPC .................................. *H04L 63/105* (2013.01)
(58) Field of Classification Search
   CPC ........... H04L 63/105; G06F 2221/2141; G06F 21/604; G06F 21/6218; Y04S 40/20
   USPC ............................................................ 726/4
   See application file for complete search history.

(56) References Cited

U.S. PATENT DOCUMENTS

| | | | |
|---|---|---|---|
| 9,325,698 B2 | 4/2016 | Lovmand | |
| 2014/0228976 A1* | 8/2014 | K. S. ....................... | F03D 7/048 |
| | | | 700/9 |
| 2016/0110377 A1* | 4/2016 | Yun ......................... | H04L 63/08 |
| | | | 707/626 |
| 2022/0188275 A1 | 6/2022 | Jassal et al. | |

OTHER PUBLICATIONS

Anil L Pereira, "RBAC for High Performance Computing Systems Integration in Grid Computing and Cloud Computing," Parallel and Distributed Processing Workshops and PHD Forum (IPDPSW), 2011 IEEE International Symposium on, IEEE, May 16, 2011, pp. 914-921.
European Patent Office, extended European Search Report for Application 22205608.7-1218 dated May 4, 2023.

* cited by examiner

*Primary Examiner* — Jahangir Kabir
(74) *Attorney, Agent, or Firm* — Patterson + Sheridan, LLP; Gero G. McClellan

(57) ABSTRACT

The invention relates to a method and a system for role based access control to a computer system of a renewable power plant. The users of the computer system are assigned roles defining permissions for the users accessing the computer system when the user login and the computer system of the renewable power plant is checking whether the local role permissions dataset stored at the computer system is different from a remote role permissions dataset stored on an off-site central computer system. If the local role permission dataset and the remote role permission dataset are different, the computer system of the renewable power plant is pulling the remote role permission dataset from the off-site central computer system and overwriting the local role permission dataset; ensuring that the local role permission dataset is identical to the remote role permission dataset.

19 Claims, 3 Drawing Sheets

ROLE-BASED ACCESS CONTROL FOR USERS IN A COMPUTER SYSTEM OF A RENEWABLE POWER PLANT

FIELD OF THE INVENTION

The present invention relates to a method for role based access control for users in a computer system of a renewable power plant and a computer system of renewable power plant adapted to perform role-based access control of users.

BACKGROUND OF THE INVENTION

A renewable power plant may comprise a plurality of computer systems. The computer systems may be power plant controllers controlling the power plant or a part of the power plant, or computer systems controlling a wind turbine or SCADA servers, network switches, routers, etc. within the power plant. Each of these computer systems may have an access control and locally store permissions for the users logging on the computer system.

In a computer system of a renewable power plant users login to the computer system by entering a username and a password, when they login the user get access to the computer system, and receives permissions to read some parameters, write some parameters and control some system functions.

Different user may have different permissions. Such permissions may be stored locally at the computer system of the renewable power plant or they may be stored in an off-site central computer system.

However, storing permissions for individually users is a risk, as the permissions stored on the computer systems of the renewable power plant may be corrupted by errors or even by malicious hacking by persons trying to get unauthorized access to the computer system of the renewable power plant.

Further, it may be that permissions for individual users, which are usually stored and updated on an off-site central computer system, may not be updated regularly on the computer systems of the renewable power plant and changes in the permissions may therefore not be effectuated.

Hence, an improved access control for computer systems of a renewable power plant would be advantageous, and in particular, a more efficient and/or reliable system or method for controlling the access to computer systems of the renewable power plant would be advantageous.

OBJECT OF THE INVENTION

It is an object of the present invention to provide a method and a computer system to ensure the permissions for users are up to date on the computer systems of a renewable power plant.

It is a further object of the present invention to provide an alternative to the prior art.

In particular, it may be seen as an object of the present invention to provide a method for role-based access control for users to computer systems of a renewable power plant that solves the above mentioned problems of the prior art with permissions for users that is not updated.

SUMMARY OF THE INVENTION

Thus, the above described object and several other objects are intended to be obtained in a first aspect of the invention by providing a method for role-based access control for users in a computer system of a renewable power plant, wherein the users are assigned roles defining permissions for the users accessing the computer system of the renewable power plant based on a local role permissions dataset stored on the computer system of the renewable power plant, Wherein the Method Comprises the Following Steps:

the computer system of the renewable power plant is checking whether the local role permissions dataset is different from a remote role permissions dataset stored on an off-site central computer system, if the local role permission dataset and the remote role permission dataset are different, pulling the remote role permission dataset from the off-site central computer system to the computer system of the renewable power plant and overwriting the local role permission dataset with the remote role permission dataset; ensuring that the local role permission dataset is identical to the remote role permission dataset.

There may be a plurality of computer systems in a renewable power plant. The computer systems may be power plant controllers controlling the entire power plant or a part of the power plant, the computer systems may be wind turbine controllers controlling the wind turbine in the power plant, and further the computers systems may be SCADA servers, network switches, routers, or basically any kind of controller systems and/or computers within the power plant. Each of these computer systems may have access control and locally store permissions for the users logging into the computer system.

When logging into a computer system of a renewable power plant, users are getting permissions depending on the roles they are assigned to. The role defines the set of permissions that a user can perform at the computer system of the renewable power plant.

Role based access control (RBAC) is an access-control mechanism defined around roles and privileges. In computer systems security RBAC is an approach to restricting access to authorized users. Roles are created for various job functions. The permissions to perform certain operations, like reading and writing parameters or controlling specific system functions, are assigned to specific roles. The users are assigned particular roles and through these role assignments acquire the permissions needed to perform particular system functions. Users without assigned roles do not get any permissions.

When a user login to a computer system of a renewable power plant, usually using a username and a password, the user will be authenticated. When the user is authenticated, the computer system will authorize the user and grant the user permissions to perform operations according to the permissions for the users' roles.

There are different roles, which may be assigned to users. There may be a read-only role, giving permission only to read data. There may be different operator roles giving permissions to update some parameter, and read some parameters, and perform some system functions, but different operators may have different roles, depending on what part of the system they are operating, having different permissions depending on their specific role. There may be a system engineer role, giving permissions for reading and writing all data, and gives permissions to run different system functions, for instance to diagnose the system or update data.

A renewable power plant may be a wind power plant, a photovoltaic power plant, a geothermic power plant or any kind of power plant using a renewable energy source.

In a renewable power plant there may be a plurality of computer systems controlling the renewable power plant, preferable the computer systems are at all times updated with the newest data regarding the roles and the permissions for a role. However, roles and permissions are updated at the off-site central computer system, which may be placed in a central user management station remote from the renewable power plant. Therefore, the updated roles and permissions must be transferred from the off-site central computer system to the computer systems of the renewable power plant.

A computer system of a renewable power plant in this document also may be referred to as the power plant computer system or simply as a computer system when context makes it clear is the computer system of a renewable power plant.

The off-site central computer system is often controlling a plurality of renewable power plants and updates in roles and permissions to the renewable power plants are often performed at the off-site central computer and later transferred to the computer systems of the renewable power plants.

There is a risk that a computer system of the renewable power plant are not updated with the newest permissions, as the updated permissions first have to be transferred from the off-site central computer system to the computer systems of the renewable power plant. Further, the permissions for a user may be changed locally in a computer system of the renewable power plant, and thereby differ from the permission stored in the off-site central computer system.

To increase security and reduce the risk, it is not allowed that the off-site central computer system by-it-selves transmits the updated roles and permissions. Instead, the computer systems of the renewable power plant pulls the information from the off-site central computer system, by sending a request for the information stored and download the information regarding permissions and roles from the off-site central computer system. It is therefore the computer systems of the renewable power plant, which are responsible for ensuring they are updated with the updated roles and permissions.

Preferable, the information regarding permissions and roles on the computer system of the renewable power plant are up to date at all times, or at least when the information is needed. Therefore, the computer system of the renewable power plant, at least when the information is needed, checks whether the information is up to date. If it is not up to date, the computer system of the renewable power plant pulls the off-site central computer system for the information regarding permissions and roles. The check may be performed every time a user login to the computer system of the renewable power plant or at certain time intervals.

The information regarding permissions and roles can be stored in the off-site central computer system in a remote role permissions dataset, typical the dataset will be stored in a computer file, which can easy be to download, and preferably, stored in a database. In a computer system of the renewable power plant, the information is stored in a local role permissions dataset, which also typically is stored in a file, but alternatively could be stored in a database.

When one of the computer systems of the renewable power plant is pulling the off-site central computer system for the data set, it receives or downloads the remote role permissions dataset from the off-site central computer system and stores it as the local role permission dataset overwriting the old local role permission dataset. Thereby it is ensured that the local role permission dataset is up to date. Any changes there may have been done to the old local role permission dataset locally are thereby overwritten and no local performed changes endures.

The invention is particularly, but not exclusively, advantageous for obtaining certainty that the local role permission dataset is up to date at all times, when the local role permission dataset is used to assign permissions to a user in a computer system of the renewable power plant. Hereby, it is ensured that the local role permission dataset is up to date, and not has been changed locally or by hackers trying to get access to the system by ensuring the local role permission dataset is identical to the remote role permission dataset.

According to an embodiment, the method comprises that the computer system of the renewable power plant is checking whether the local role permissions dataset is different from a remote role permissions dataset stored on the off-site central computer system at least when a user login to the computer system of the renewable power plant.

Every time a user login to a computer system of a renewable power plant, the computer system checks, whether the local role permissions dataset is different from a remote role permissions dataset.

Hereby it is ensured that the permissions assigned to the user from the local role permissions dataset, according to the roles of the user, is up to date according to the latest version of the remote role permissions dataset.

According to an embodiment, the method comprises that the computer system of the renewable power plant is checking whether the local role permissions dataset is different from a remote role permissions dataset stored on the off-site central computer system at least at predetermined intervals.

At predetermined time intervals, the computer systems of the renewable power plant checks whether the local role permissions dataset is different from a remote role permissions dataset. The time interval may be once an hour, a day, a week, a month or at even longer time intervals.

By checking at predetermined intervals, the probability that the local role permissions dataset is up to date and identical to the remote role permissions dataset is increased. Thereby, when a user is accessing the computer system of the renewable power plant, it is likely that the local role permissions dataset is up to date and do not need to be downloaded, slowing the login time for the user. The time interval is preferably chosen to be substantially smaller that an expected update of remote role permission dataset on the off-site central computer system. Hereby ensuring that the local role permission database is unlikely to be different from the remote role permission dataset.

According to an embodiment, the method comprises checking whether the local role permissions dataset is different from the remote role permissions dataset is done by comparing version data for the datasets, wherein the version data comprises one or more of 1) version number, 2) version date, 3) title, 4) product code, 5) data size.

A computer system of a renewable power plant may check the status of the local role permissions dataset by requesting the version data of the remote role permissions dataset from the off-site central computer system, and comparing the version data with the version data of the local role permissions dataset stored in the computer system of the renewable power plant. If there is any difference, the versions are different and then the computer system pulls for the remote role permissions dataset, which is then downloaded.

Checking the versions data is a simple way to check if the local role permissions dataset is up to date.

According to an embodiment, the method comprises that the computer system of the renewable power plant requests and receives one or more of 1) version number, 2) version date, 3) title, 4) product code, 5) data size for the remote role permissions dataset from the off-site central computer system.

By checking version data by the computer system of the renewable power plant, it is determined if a new version of the remote role permissions dataset has been uploaded to the off-site central computer system. Therefore, checking version data ensures the version at the computer system of the renewable power plant is identical with the version at the off-site central computer system.

According to an embodiment, the method comprises checking whether the local role permissions dataset is different from the remote role permissions dataset is done by determining a hash code for the local role permissions dataset and comparing it to a hash code determined for the remote role permissions dataset.

A computer system of a renewable power plant may be checking the status of the local role permissions dataset by requesting a hash code for the remote role permissions dataset from the off-site central computer system, and comparing it to the hash code it is determining for the local role permissions dataset. If there is any difference then the computer system of the renewable power plant pulls the remote role permissions dataset.

There are well-known standard methods for how to generate a hash code. The hash code is a value generated from the remote role permissions dataset by the off-site central computer system and from the local role permissions dataset by the computer system of a renewable power plant. The same method is used by the off-site central computer system and the computer system of a renewable power plant, therefore the two values should be identically, if the datasets are identically.

Using hash codes is more secure than using version data because version data may not be changed, if some of the data in the file is changed. By using hash codes, it will be almost impossible for hackers to make changes to the local role permissions dataset without leading to changes in the hash code, as the hash code will be different when the file content is changed.

According to an embodiment, the method comprises that the computer system of the renewable power plant requests and receives the hash-code for the remote role permissions dataset from the off-site central computer system.

When comparing the hash codes, the computer system of the renewable power plant may request the hash code for the remote role permissions dataset from the off-site central computer system. The computer system of the renewable power plant calculates the hash code from the local role permissions dataset, so it can compare the hash codes to check, whether the remote role permissions dataset and the local role permissions dataset are identical.

According to an embodiment, the method comprises that users logging in to the computer system of the renewable power plant are authenticated and assigned roles, preferable according to a user profile.

When a user login to one of the computer systems of the renewable power plant, the user can be authenticated and then assigned roles, the roles authorizes the user to access data in the computer system and to update data in the computer system.

Users usually has a user profile, which may contain information about which roles may be assigned to the user. Alternatively, there may be a file or dataset with information about the roles, a user may be assigned to.

According to an embodiment, the method comprises that the users with assigned roles are authorized with permissions to access and/or update selected data and selected parameters on the computer system of the renewable power plant.

For each role it may be defined which data the user having this roll may access and which data the user may update.

By assigning permissions to users according to roles, it may be ensured that the users have the right permissions. It is easier to update permissions for roles than it is to update permissions for each user individually; the risk of corrupting the local role permissions dataset with errors may be considerably reduced.

According to an embodiment, the method comprises that the users with assigned roles are authorized with permissions to perform specific system functions on the computer system of the renewable power plant.

The role of a user may also define which system functions the user may perform, for instance the user may start different programs in the computer system of the renewable power plant, for instance to perform updates or maintenance programs, or programs that collects data from the computer system.

According to an embodiment, the method comprises that permissions authorize the users to access and/or update data, and/or to perform specific system functions on specific devices of the renewable power plant.

In a renewable power plant, there may be different devises or different units in the power plant. For instance, a wind power plant may comprises a plurality of wind turbines and each turbine may have its own computer system controlling the wind turbine. The user may have access to the computer systems of some of wind turbines and not to others, therefore the role specified for a user may give permissions to access, update or perform specific system functions or operations to local control systems in some wind turbines and not in other wind turbines.

According to an embodiment, the method comprises that the assigned roles authorize the users to access and/or update data, and/or to perform specific system functions on the communication between the computer system of the renewable power plant and external systems.

The computer system of the renewable power plant may be able to communicate with external systems like receiving whether forecasts, predictions or requests regarding power production, and the user may be authorized to set up or update parameters for such communication.

According to an embodiment, the method comprises that the assigned roles authorized the users to change settings in the computer system of the renewable power plant, which changes power injection of the renewable power plant to a power grid.

The power plant may be connected to a power grid. There may be parameters or settings in one, or more, of the computer systems of the renewable power plant that regulates the power injections from the renewable power plant to the power grid. The assigned role to a user may authorize the user to update these parameters.

In a second aspect, the invention relates to a computer system of a renewable power plant adapted to perform role-based access control of users, wherein the users are assigned roles defining permissions for the users accessing the computer system of the renewable power plant based on a local role permissions data set stored on the computer system of the renewable power plant, wherein the computer system of the renewable power plant is adapted to check whether the local role permissions dataset is different from a remote role permissions dataset stored on an off-site central computer system, and if the local role permission dataset and the remote role permission dataset are different, the computer system of the renewable power plant is adapted to pull the remote role permission dataset from the off-site central computer system to the computer system of the renewable power plant and overwrite the local role permission dataset with the remote role permission dataset; ensuring that the local role permission dataset is identical to the remote role permission dataset.

In a third aspect, the invention relates to a computer program product being adapted to enable a computer system comprising at least one computer having data storage means in connection therewith to control a renewable power plant computer system according to the second aspect of the invention, such as a computer program product comprising instructions which, when the program is executed by a computer, cause the computer to carry out the method of first aspect of the invention.

This aspect of the invention is particularly, but not exclusively, advantageous in that the present invention may be accomplished by a computer program product enabling a computer system to carry out the operations of the renewable power plant computer system of the second aspect of the invention when down- or uploaded into the computer system. Such a computer program product may be provided on any kind of computer readable medium, or through a network.

The individual aspects of the present invention may each be combined with any of the other aspects. These and other aspects of the invention will be apparent from the following description with reference to the described embodiments.

BRIEF DESCRIPTION OF THE FIGURES

The role-based access control for user in a computer system of the renewable power plant according to the invention will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

Figure 1:
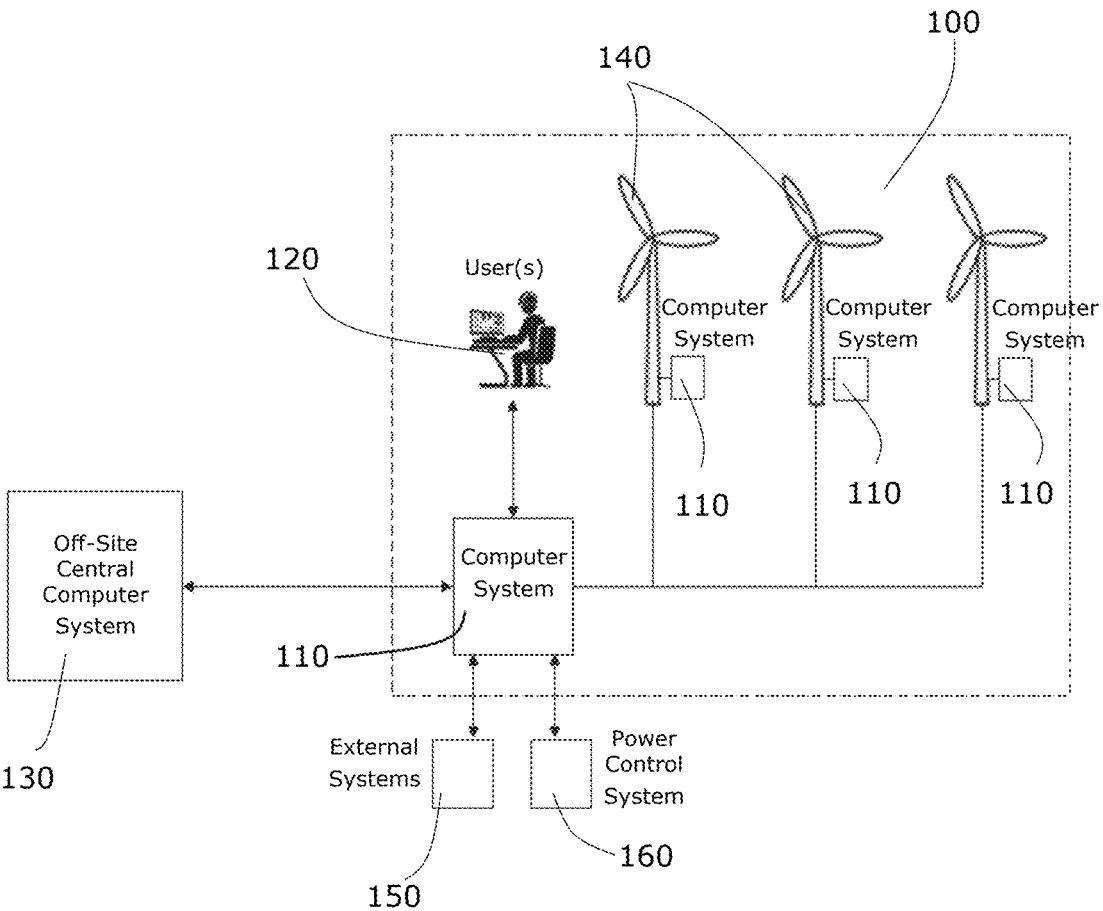
FIG. 1 illustrates a renewable power plant.

FIG. 1 illustrates a renewable power plant 100, which in FIG. 1 is a wind power plant comprising a plurality of wind turbines 140, but may be any kind of renewable power plant. The renewable power plant 100 comprises a plurality of computer systems 110. The computer systems 110 of the renewable power plant are connected, preferable wireless, to an off-site central computer system 130. A user 120 is accessing one of the power plant computer systems 110. Other computer systems of the renewable power plant are shown next to the wind turbines, they may be wind turbine controllers. However, many other computer systems of the renewable power plant may be present, but not shown. In addition, the power plant computer systems 110 may communicate with external systems 150, and there may be roles assigned to users 120 with permission to access and update data for controlling the communication with external systems. There may also be a power control system 160 for controlling settings for power injections to a power grid, and there may be roles assigned to users with permissions to access and update data for controlling the injections to the power grid.

The renewable power plant may comprise a plurality of computer systems 110. The computer systems may be a power plant controller, wind turbine controllers located in or near the individual wind turbines 140, SCADA servers, network switches, routers, and basically any controller system and computer unit within the power plant.

Figure 2:
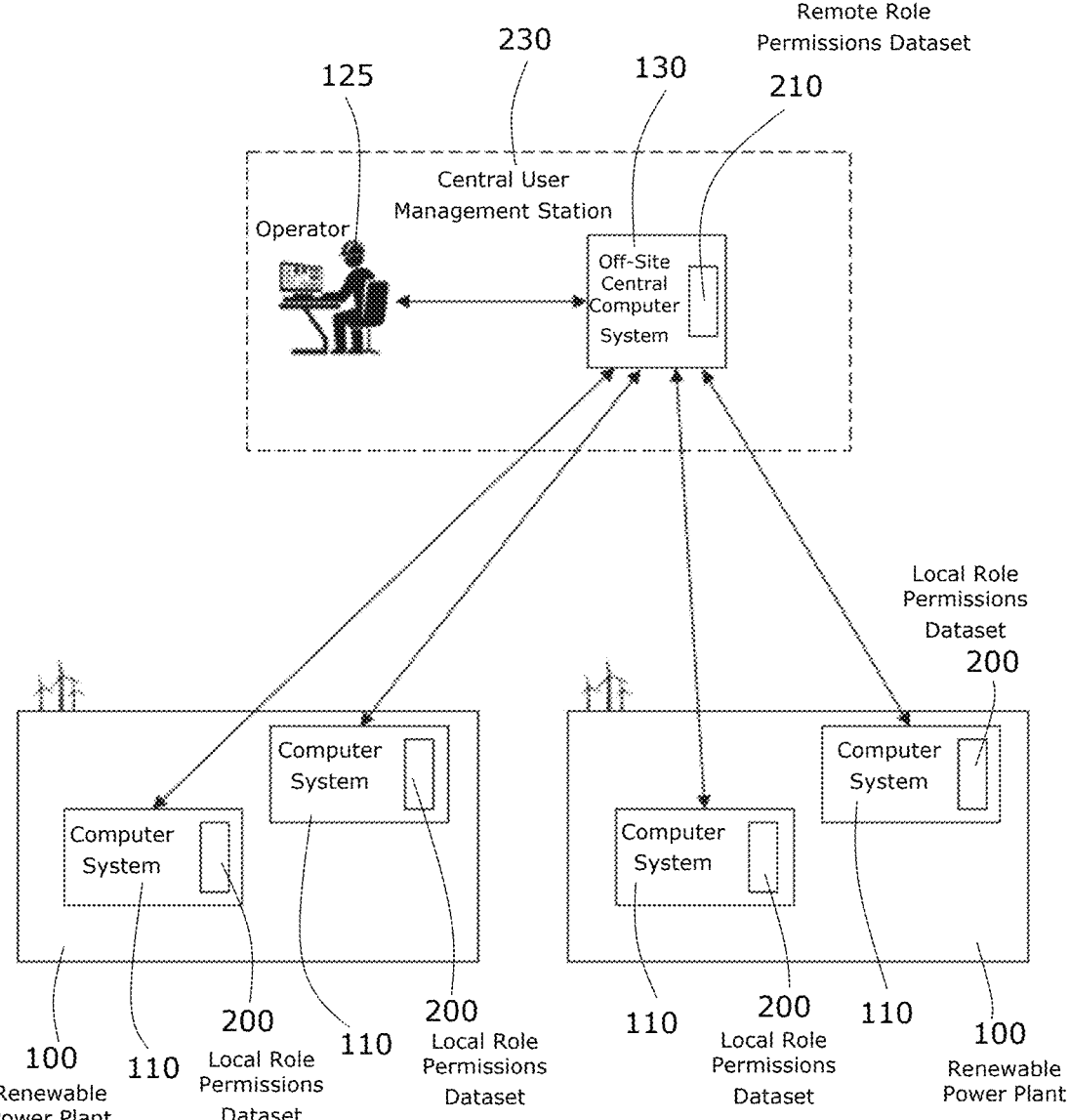
FIG. 2 illustrates a central user management station and a renewable power plant.

FIG. 2 illustrates the central user management station 230 and the renewable power plants 100. The central user management station 230 may service a plurality of renewable power plants 100. In FIG. 2, two renewable power plants 100 are illustrated. In one renewable power plant, there may be a plurality of power plant computer systems; in FIG. 2, it is illustrated with each of the shown two renewable power plants 100 comprising two computer systems 110. Each computer system of the renewable power plant may be in contact with the off-site central computer system 130. The central user management station 230 comprises an off-site central computer system 130, which comprises the remote role permissions dataset 210. An operator 125 is accessing the off-site central computer system 130, and the operator may be updating the remote role permissions dataset 210.

Each of the computer systems 110 of the renewable power plant are connected, e.g. wireless, with the central user management station 230. Each of the computer systems 110 of the renewable power plant may comprise a local role permissions dataset 200 and may be able to check whether the local role permissions dataset 200 is identical to the remote role permissions dataset 210. In case the datasets are different, the computer system 110 of the renewable power plant may pull for the remote role permissions dataset and download it.

Figure 3:
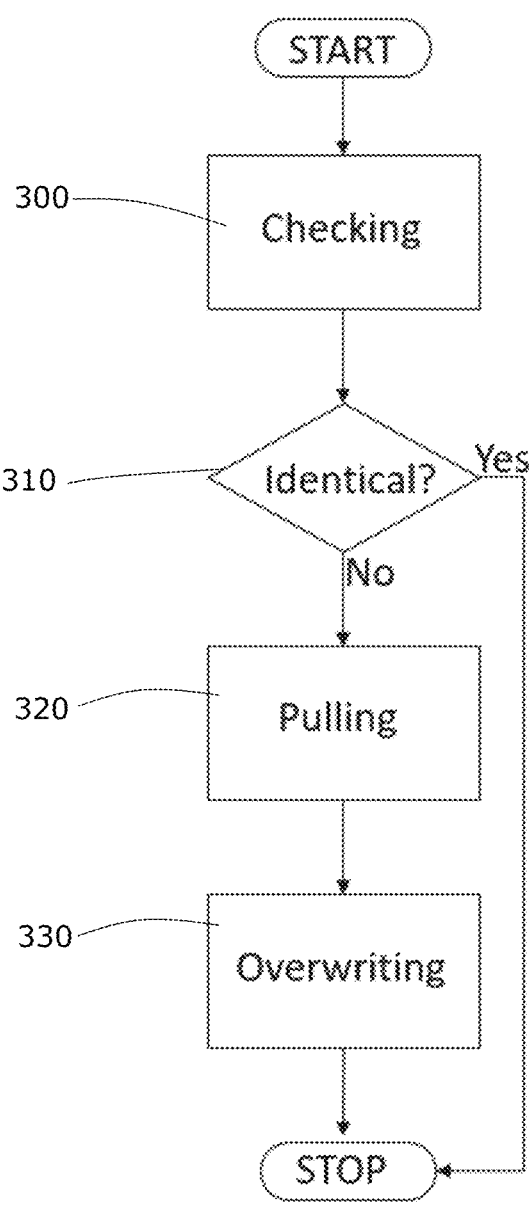
FIG. 3 illustrates a method for checking and downloading the remote role permissions dataset.

FIG. 3 illustrates a method for checking and downloading the remote role permissions dataset 210. First, the computer system of the renewable power plant is checking 300 whether the remote role permissions dataset 210 is identically to the local role permissions dataset 200. If they are identical 310, then no further action is needed, however if they are not identical, then the computer system of the renewable power plant is pulling 320 the off-site central computer system 130 for the dataset, allowing the computer system 110 of the renewable power plant to download the remote role permissions dataset 210. When the computer system of the renewable power plant has received or downloaded the remote role permissions dataset 210 it is overwriting 330 the old local role permissions dataset with the downloaded dataset, which then become the new updated local role permissions dataset 200.

The invention can be implemented by means of hardware, software, firmware or any combination of these. The invention or some of the features thereof can also be implemented as software running on one or more data processors and/or digital signal processors.

The individual elements of an embodiment of the invention may be physically, functionally and logically implemented in any suitable way such as in a single unit, in a plurality of units or as part of separate functional units. The invention may be implemented in a single unit, or be both physically and functionally distributed between different units and processors.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method for role-based access control for users in a computer system of a renewable power plant, wherein the users are assigned roles defining permissions for the users accessing the computer system of the renewable power plant based on a local role permissions dataset stored on the computer system of the renewable power plant, wherein the method comprises:

checking, by the computer system of the renewable power plant, whether the local role permissions dataset is different from a remote role permissions dataset stored on an off-site central computer system, and when the local role permission dataset and the remote role permission dataset are different, pulling the remote role permission dataset from the off-site central computer system to the computer system of the renewable power plant and overwriting the local role permission dataset with the remote role permission dataset, ensuring that the local role permission dataset is identical to the remote role permission dataset, wherein the users log into the computer system of the renewable power plant to be authenticated, wherein the assigned roles authorize at least one of the users to change a parameter in the computer system to regulate power injections from the renewable power plant to a power grid to which the renewable power plant is connected.

2. The method according to claim 1, wherein the checking is done at least when a user logs into the computer system of the renewable power plant.

3. The method according to claim 1, wherein the checking is done at least at predetermined intervals.

4. The method according to claim 1, wherein the checking comprises comparing version data for the local role permission dataset and the remote role permission dataset, wherein the version data comprises one or more of 1) version number, 2) version date, 3) title, 4) product code, or 5) data size.

5. The method according to claim 4, wherein the computer system of the renewable power plant requests and receives one or more of 1) version number, 2) version date, 3) title, 4) product code, or 5) data size for the remote role permissions dataset from the off-site central computer system.

6. The method according to claim 1, wherein the checking comprises determining a hash code for the local role permissions dataset and comparing it to a hash code determined for the remote role permissions dataset.

7. The method according to claim 6, wherein the computer system of the renewable power plant requests and receives the hash code for the remote role permissions dataset from the off-site central computer system.

8. The method according to claim 1, wherein users logging into the computer system of the renewable power plant are authenticated and assigned roles, according to a user profile.

9. The method according to claim 8, wherein the users with assigned roles are authorized with permissions to access and/or update selected data and selected parameters on the computer system of the renewable power plant.

10. The method according to claim 8, wherein the users with assigned roles are authorized with permissions to perform specific system functions on the computer system of the renewable power plant.

11. The method according to claim 1, wherein the permissions authorize the users to access and update data and/or to perform specific system functions on specific devices of the renewable power plant.

12. The method according to claim 8, wherein the assigned roles authorize the users to access and/or update data, and/or to perform specific system functions on communication between the computer system of the renewable power plant and external systems.

13. The method according to claim 8, wherein the assigned roles authorized the users to change settings in the computer system of the renewable power plant, which changes power injection of the renewable power plant to a power grid.

14. A computer system of a renewable power plant adapted to perform role-based access control of users, wherein the users are assigned roles defining permissions for the users accessing the computer system of the renewable power plant based on a local role permissions dataset, wherein the computer system comprises:

one or more data processors; and a computer readable medium storing the local role permissions dataset and instructions, which, when executed by the one or more data processors, cause the one or more data processors to carry out an operation, the operation comprising:

checking whether the local role permissions dataset is different from a remote role permissions dataset stored on an off-site central computer system, and when the local role permission dataset and the remote role permission dataset are different, pulling the remote role permission dataset from the off-site central computer system to the computer system of the renewable power plant and overwrite the local role permission dataset with the remote role permission dataset, ensuring that the local role permission dataset is identical to the remote role permission dataset, wherein the users log into the computer system of the renewable power plant to be authenticated, wherein the assigned roles authorize at least one of the users to change a parameter in the computer system to regulate power injections from the renewable power plant to a power grid to which the renewable power plant is connected.

15. The computer system according to claim 14, wherein the computer system is adapted to perform the checking at least when a user logs into the computer system of the renewable power plant.

16. The computer system according to claim 14, wherein the computer system is adapted to perform the checking at least at predetermined intervals.

17. The computer system according to claim 14, wherein the computer system is adapted to perform the checking by comparing version data for the local role permission dataset and the remote role permission dataset, wherein the version data comprises one or more of 1) version number, 2) version date, 3) title, 4) product code, or 5) data size.

18. A renewable power plant, comprising:

a plurality of wind turbines; and a computer system adapted to perform role-based access control of users, wherein the users are assigned roles defining permissions for the users accessing the computer system of the renewable power plant based on a local role permissions dataset, wherein the computer system comprises:

one or more data processors; and a computer readable medium storing the local role permissions dataset and instructions, which, when executed by the one or more data processors, cause the one or more data processors to carry out an operation, the operation comprising:

checking whether the local role permissions dataset is different from a remote role permissions dataset stored on an off-site central computer system, and when the local role permission dataset and the remote role permission dataset are different, pulling the remote role permission dataset from the off-site central computer system to the computer system of the renewable power plant and over-write the local role permission dataset with the remote role permission dataset, ensuring that the local role permission dataset is identical to the remote role permission dataset, and wherein the users logging into the computer system are authenticated and assigned roles, and wherein the assigned roles authorize at least one of the users to change a parameter in the computer system to regulate power injections from the renewable power plant to a power grid to which the renewable power plant is connected.

19. The renewable power plant according to claim 18, wherein the assigned roles authorize at least one user to access, update or perform specific system functions or operations to local control systems of some of the plurality of wind turbines and not to local control systems of other ones of the plurality of wind turbines.

* * * * *